Patented Feb. 26, 1952

2,587,249

UNITED STATES PATENT OFFICE 2,587,249

PREVENTION OF CORROSION IN STEAM LINES

Richard C. Ulmer, Tuckahoe, N. Y., assignor to E. F. Drew & Co., Inc., New York, N. Y., a corporation of Delaware No Drawing. Application February 18, 1947, Serial No. 729,415

5 Claims. (Cl. 210—23)

The present invention is directed to the prevention of corrosion of steam lines, both supply and return and equipment served by these lines, more particularly to the treatment of water and/or steam, whereby the properties thereof are sufficiently changed so as to minimize or prevent said corrosion.

A considerable difficulty has arisen, particularly in lines carrying the steam at all pressures, whereby corrosion of the metal of the pipes, fittings and equipment has taken place. It has been determined that this type of corrosion results largely from the low pH of the steam and of the water condensed in said pipes. This low pH is due to acid constituents in the steam and primarily due to the presence of carbon dioxide which is mixed with the steam and water, due to liberation thereof in the boiler by the breaking down of carbonates and other substances in the water of the boiler. Also, the presence of oxygen in the system aggravates said corrosion by acting in conjunction with the low pH. It has been found that when the pH is below 6.5, such action occurs.

Attempts have been made to overcome said corrosion by introducing into the boiler itself or into the steam lines, gaseous ammonia or low boiling amines. However, such methods have not been completely successful, due to the fact that the ammonia is gaseous and the amines are highly volatile, so that it is almost impossible to obtain uniform treatment such as to continuously prevent corrosion. If the ammonia is introduced into the boiler, it is immediately volatilized from the water so that its effect is transitory. The amines are highly expensive and because of the large volume required for the purpose of even partially preventing corrosion, they have been considered too expensive for ordinary commercial use.

It has also been proposed to introduce into the boiling water, salts of ammonia, such as ammonium sulphate, but such treatment has not been successful. The salt is relatively stable and therefore it is difficult to obtain an effect of volatilization of ammonia for treatment of the steam lines. Also, the sulphate radical remaining in the boiler water is highly undesirable as it tends to produce scale or deposits, which are difficult to remove.

The present invention is intended and adapted to overcome the difficulties and disadvantages inherent in prior treatments of boiler water or steam lines for the prevention of corrosion in said lines, it being among the objects of the present invention to provide a substance which is sufficiently stable so that it may be fed either into the boiler or the steam lines and be capable of giving up a volatile substance adapted to neutralize carbon dioxide and other acid constitutents continuously, and over a substantial period of time.

It is also among the objects of the present invention to provide a substance of the character described, which in the reactions will decompose to give a volatile alkaline material and provide a residue which is of substantial assistance in the treatment of boiler water.

It is further among the objects of the present invention to provide a method and material for the treatment of steam and/or water, which is simple, easily prepared, economical in use, and which is highly effective for the stated purpose.

The basis of the present invention is the discovery that certain salts of alginic acid or algin have such properties as to adapt the same for the present purposes. The alginates have as the positive thereof, ammonium or the radical amines volatile at the temperature of the steam in the lines to be treated. Not only the mono-amines, but polyamines are suitable for the purpose. Generally an excess of the basic material is used, and where ammonia is combined with the alginic acid, the excess of ammonia is held in the colloidal alginic acid compound so that at ordinary temperatures it does not readily volatilize. It is probably in a loose combination.

When salts of the above type are used, they may be introduced either into the water of the boiler or into the steam lines, preferably the former. In introducing the same into the boiler feed water, it is so proportioned that it raises the pH of the boiler water to 6.5–8.5. Below this range the alginate reduces corrosion, and above this limit, corrosion may be still further reduced, but the effect is slight. Therefore, according to the present invention, the amount of alginates added is that calculated to give the desired range of pH.

The alginates are usually added continuously as the feed water flows into the boiler. By continuously is meant either completely continuously or substantially continuously, and in the latter case the feeding may be at relatively short intervals of time, say not more than 5 to 10 minutes between each feeding. It is unnecessary to treat all of the water in the boiler as any condensed steam from the treated steam lines still retains the effects of the alginate and no provision need be made for the addition of further alginate to this water. It is only necessary to add the alginate to the fresh or make-up water added to the boiler.

While the exact structural formula and composition of alginic acid is not fully known, the following structural formula indicates the widely accepted formula for said algin.

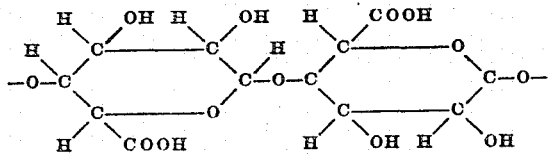

The length of the chain has not been determined. Each of the heterocyclic rings has a free carboxyl group thereon and the basic material is caused to replace the hydrogen of the carboxyl group. This may be accomplished in any one of a number of ways.

There is provided a mixture of alginic acid or algin in the free state and a substantial amount of water. The mixture is made uniform and is stirred. To 1 gallon of this colloidal mixture, containing about 5% of algin, there is gradually added, and with continued stirring, 5 pints of an ammonia solution in water of about 26° Baumé. No heating is required and the solution may be used directly for feeding into a boiler or a steam line.

The alginate may also be prepared from the sodium alginate salt which is now on the market. The sodium alginate is dissolved in a sufficient amount of water and there is added thereto a water-soluble acid, such as sulphuric acid or hydrochloric acid, with stirring, until the alginic acid has been freed. Since the latter is insoluble in water, it precipitates out. When precipitation is complete, the mixture is filtered, the precipitate washed, and the alginic acid is then mixed with a sufficient quantity of water to provide a free flowing mixture. Ammonia solution is added, with continued stirring until all of the precipitated alginic acid has dissolved. An excess of ammonia amounting to 20–25% of that added is introduced. The solution so formed is then adaptable for direct use in the aforesaid treatment.

When amines are utilized, the procedure is similar to that outlined above, but in the case of some amines, it may be necessary or desirable to hasten the reaction in the formation of the alginate by the use of heat. An excess of the amine may be used, in which case the additional quantity is held either by adsorption or by loose chemical combination in the alginate.

There are numerous advantages in the use of the compounds of the present invention. The quantity of alginate used relative to the pH desired therein can be accurately calculated in advance and the feeding mechanism for the alginate may be set at the desired control point so that exactly calculated quantities of alginates may be fed automatically or semi-automatically, with the certainty that the anti-corrosion effect will be maintained continuously. The exact amounts of the alginate to be added cannot be set forth herein because the amount varies with the changes in the condition or character of the water used in the boiler, but tables are available for quickly determining the proportions to be used. As a guide, in many cases, ⅜ pint of a 5% alginate solution in water will be sufficient for each 1,000 gallons of make-up water or water which had not been previously treated.

The action of the alginates as they are fed into the boiler is that as soon as the temperature of the feed water containing the alginate has been sufficiently raised, the ammonia which had been adsorbed or loosely held in the composition is immediately freed and mixes with the steam. Therefore an immediate result is obtained. Then with the lapse of time, there is a gradual decomposition of the alginate with the formation of free ammonia, which vaporizes as it is released and gives continuous protection against corrosion. As the said decomposition takes place, the alginic acid is thus formed in colloidal state and it furnishes highly desirable colloid to the boiler water, which removes suspended matter from the water but at the same time does not allow the precipitates to form scale on the boiler walls. The alginic acid, although organic in nature, is quite stable and does not appreciably decompose under the temperatures and pressures encountered in steam boilers. The fact that some alginate is practically always present in the boiler, is further insurance that there will not be any very low pH in the water at any time, even though feeding of the alginates is not continuous.

The alginates have an advantage over inorganic salts such as ammonium sulphate in that they do not increase the concentration of soluble salts in the boiler water. The alginates are not poisonous or toxic, whereas most of the amines do have toxic effects.

It is important where the steam is to be used for cooking purposes or other processes where human being are involved, that there be no odor therein. Most of the amines if used in sufficient amounts to prevent corrosion will produce high undesirable odors for such purposes. According to the present invention, the treatment does not produce any appreciable amount of odor either in the condensed water or in the steam. Ammonium alginate and the like when used in proper amounts for the above treatment do not cause any substantial corrosion of brass or copper, whereas where ammonia is used, because of the impossibility of adequately controlling the concentration, it often causes serious corrosion of such metals.

Although the invention has been described with specific reference to ammonium alginate with or without an excess of combined ammonia, this example was given for the purpose of illustrating the invention and not of limiting the same thereto. It will be apparent that many variations in the details of the operation of the invention may be made within the spirit thereof. For instance, the amounts of the alginate fed into the system may be such as to raise the pH above the limit set herein, but such additional amounts are unnecessary. Various amines, both mono and poly amines, may be used, such as the mono alkyl amines wherein the alkyl group has from 1 to 6 or 7 carbon atoms. Such polyamines as ethylene diamine are also applicable. It is essential that whatever amine is used, its boiling point be at about or below the temperature within the boiler or the steam line where it is used. The excess of ammonia or amine may not be held by adsorption or by chemical combination, but the present invention includes the presence of such excess regardless of the exact mechanism involved therein.

The treatment is adapted not only to the steam lines themselves, but also to the equipment connected thereto, the return or condensate lines, and the various fittings, including traps, heat exchangers, etc. The term "steam lines" as used in the claims include all such elements.

I claim:

1. A method of preventing corrosion of steam lines which comprises feeding into the water of a steam boiler an alginic acid compound of ammonia, said compound being adapted to decompose gradually at temperatures of steam formation to provide free gaseous ammonia, together with an excess of ammonia in an amount up to 25% of that required to combine with said alginic acid.

2. A method of preventing corrosion of steam lines which comprises substantially continuously feeding into the water of a steam boiler an alginate of a substance taken from the class consisting of ammonia and amines volatile at the temperature of said steam, said compound being adapted to decompose gradually at temperatures of steam formation to provide free gaseous ammonia, together with an excess of ammonia in an amount up to 25% of that required to combine with said alginic acid.

3. A method of preventing corrosion of steam lines which comprises feeding into the water of a steam boiler an alginic acid compound of ammonia, the amount of alginate being sufficient to maintain a pH in said steam lines of 6.5 to 8.5, said compound being adapted to decompose gradually at temperatures of steam formation to provide free gaseous ammonia.

4. A method of preventing corrosion of steam lines which comprises feeding into said steam lines an alginic acid compound of ammonia, the amount of ammonia being in excess of 1 mol. for each ring of said alginic acid, said excess being up to 25% of the amount required to combine with said alginic acid, said compound being adapted to first liberate said excess ammonia and then to decompose gradually at temperatures of steam formation to provide free gaseous ammonia.

5. A product for preventing corrosion of steam lines comprising an alginate of a substance taken from the class consisting of ammonia and amines volatile at the temperature of said steam, the amount of said ammonia being in excess of that required to neutralize said compound, said excess being up to 25% of that required to combine with said alginic acid and being loosely held by said alginate, said compound being adapted to first liberate said excess ammonia and then to decompose gradually at temperatures of steam formation to provide free gaseous ammonia.

RICHARD C. ULMER.

REFERENCES CITED

The following references are of record in the file of this patent:

UNITED STATES PATENTS

| Number | Name | Date |
|---|---|---|
| 1,619,036 | Ravnestad | Mar. 1, 1927 |
| 2,053,024 | Dreyfus | Sept. 1, 1936 |
| 2,158,486 | Preble | May 16, 1939 |
| 2,158,487 | Preble | May 16, 1939 |
| 2,393,293 | Corley | Jan. 22, 1946 |
| 2,400,543 | Denman | May 21, 1946 |

FOREIGN PATENTS

| Number | Country | Date |
|---|---|---|
| 177,761 | Great Britain | Feb. 1, 1923 |